United States Patent [19]

Oda et al.

[11] 4,178,417

[45] Dec. 11, 1979

[54] CLAD STEEL

[75] Inventors: Toyohisa Oda; Kinichi Inouye, both of Funabashi, Japan

[73] Assignees: The Japan Steel Works, Ltd., Tokyo; Asahi Kasei Kogyo Kabushiki Kaisha, Osaka, both of Japan

[21] Appl. No.: 876,902

[22] Filed: Feb. 13, 1978

Related U.S. Application Data

[63] Continuation-in-part of Ser. No. 780,276, Mar. 23, 1977, abandoned.

[51] Int. Cl.$^2$ ............................................. B32B 15/18
[52] U.S. Cl. .................................... 428/679; 148/127; 428/683; 428/684
[58] Field of Search ...................... 148/36, 12 F, 12 C, 148/127; 428/679, 683, 684

[56] References Cited

U.S. PATENT DOCUMENTS

| | | | |
|---|---|---|---|
| 2,770,030 | 11/1956 | Carpenter et al. | 428/939 |
| 2,963,129 | 12/1960 | Eberle | 428/638 |
| 3,064,112 | 11/1962 | Hanzel | 219/44 |
| 3,121,949 | 2/1964 | Wright, Jr. | 228/221 |
| 3,403,988 | 10/1968 | Carter | 428/683 |
| 3,555,169 | 1/1971 | Miller | 428/677 |
| 3,595,632 | 7/1971 | Ross | 428/677 |
| 3,607,456 | 9/1971 | Forand, Jr. | 148/12 C |
| 3,717,444 | 2/1973 | Heitmann | 428/667 |
| 3,854,891 | 12/1974 | Chivinsky | 428/660 |
| 3,861,883 | 1/1975 | Uto et al. | 428/638 |
| 3,915,666 | 10/1975 | Veitl et al. | 428/683 |
| 3,918,928 | 11/1975 | Kiyonaga et al. | 428/684 |
| 3,956,809 | 5/1976 | Chivinsky | 428/683 |

FOREIGN PATENT DOCUMENTS

| | | | |
|---|---|---|---|
| 46-37252 | 5/1966 | Japan | 428/677 |
| 42-378 | 1/1967 | Japan | 428/660 |
| 42-379 | 1/1967 | Japan | 428/660 |
| 42-380 | 1/1967 | Japan | 428/660 |
| 797023 | 6/1958 | United Kingdom | 428/684 |
| 1236598 | 6/1971 | United Kingdom | 148/12 C |
| 1347846 | 2/1974 | United Kingdom | 428/667 |

Primary Examiner—Arthur J. Steiner

[57] ABSTRACT

This invention relates to a clad steel in which an extremely low carbon steel used as a base metal is bonded together with an austenite stainless steel, nickel or nickel alloy as a cladding metal by a rolling or an explosive process, and more particularly to a clad steel having superior properties in which Ti and/or Zr are added to the base metal in order to fix carbon contained therein.

4 Claims, 6 Drawing Figures

CLAD STEEL

This application is a continuation-in-part of Ser. No. 780,276 filed Mar. 23, 1977 (now abandoned).

BACKGROUND OF THE INVENTION

The present invention relates to a clad steel in which an extremely low carbon steel used as a base metal is bonded together with an austenite stainless steel, nickel or nickel alloy as a cladding metal by a rolling or an explosive process, and more particularly to a clad steel having superior properties in which Ti and/or Zr are added to the base metal in order to fix carbon contained therein, or an extremely low carbon steel containing Ti and/or Zr is interposed between a base metal and a cladding metal in order to suppress the transfer of C by diffusion from the base metal to the cladding metal and in which the corrosion resistivity and the workability of the cladding metal are reserved, deterioration of the bonding force is prevented and the effective thickness of the cladding metal is maintained.

Although clad steel is required to make a cladding metal to preserve its original properties in order to exhibit necessary functions as products, when (a) its bonding between the base steel and the cladding metal is carried out by pressure through a hot plastic deformation;

(b) it is hot worked after bonding; or (c) it is subjected to a solid solution heat treatment in the form of a bonded metal; etc., in conventional clad steel any carbon contained in its base steel is transferred by diffusion or carburizing into the cladding metal so that the quality of the clad steel deteriorates. That is, according to the diffusion of carbon into the cladding metal, the decrease in its original properties such as a decrease in corrosion resistivity, deterioration in formability due to a decrease in malleability, etc. results.

Further, the diffusion of carbon into the cladding metal also acts to substantially decrease its effective thickness which must possesses its original properties. Therefore, a clad steel which has a thin layer of a cladding metal or a low cladding ratio can become a matter of great concern unless the phenomena of the diffusion of carbon solved.

In order to solve this phenomena hitherto various attempts have been proposed. For instance, a publication entitled "A Hand of Metal Surface Treatment Engineering", issued on Feb. 20, 1972 by the Daily Industrial News Papers, Page 1,097, describes a technique in which nickel or iron plating is interposed between a base steel and a cladding one.

Recently, Japanese Patent Publication No. 31544/1975 discloses a process in which in order to retard or prevent the carbon diffusion of steel comprising 5 to 40% of Cr, 16 to 50% of Ni, etc. an interlayer, i.e. barrier layer, is interposed between the base steel and the cladding one.

Japan Patent Laid-Open Patent Publication No. 2654/1976 also discloses a method for prevention of carbon diffusion by the use of a base steel which contains a smaller amount of C than that contained in the cladding metal.

U.S. Pat. No. 3,121,949 discloses a method in which in manufacturing a cladding steel from Ti and a mild steel by hot rolling, Cr, Mo, Ti, Nb, V and Zr are added to the mild steel to convert C in it to carbides so that a bonding having a ductility between Ti and the mild steel is realized.

As a most recent technique U.S. Pat. No. 3,956,809 discloses a method for prevention of carburization in which as a base metal a low carbon steel added with Ti and Nb in an amount of 5 to 15 times its carbon content is used.

Although various new processes have been developed as indicated above, it is true that the effects of a conventional electro-plating process can be recognized to some extent. In order to achieve good results by the electroplating process, however, it is necessary to increase the thickness of the electro-plating layer, which results in not only a problem in the strength of bonding, but also makes practical use difficult due to higher costs.

On the other hand, the process disclosed in Japan Patent Publication No. 31544/1975 as above described uses an alloy containing large amounts of Cr and Ni, so this process also makes the cost higher and it can be expected to obtain only an effect substantially similar to the electoplating process.

Also the process disclosed in Japanese Laid-Open Patent Publication No. 2654/1976, in reality, unless the amount of C in the base steel is small (e.g. 0.003% at the maximum) diffusion of carbon from the base steel to the cladding metal cannot be avoided due to the existence of a difference in affinity between Fe-C and Cr-C.

Although the method disclosed in U.S. Pat. No. 3,121,949 was tested, it was confirmed that when any metal other than Ti was used as a cladding metal effectiveness was exhibited, but when Ti was used as a cladding metal the effect was scarcely recognizable.

U.S. Pat. No. 3,956,809 provides a quite effective method. No substantial carburization is observed microscopically when the Ti/C ratio becomes larger than 8, although chemical analysis shows that the prevention of carburization is not perfect. When the cladding ratio is small, the carburization reaches as far as the surface of the stainless steel so that the corrosive resistivity and workability deteriorate. Of course, if the Ti/C ratio is less than 8 the prevention of carburization is imperfect. Further, owing to the addition of carbon fixing elements to the base metal, the yield strength of the base metal is decreased and its grain size is made larger than 3 so that the deep drawing characteristics of the clad steel should be improved. However, as shown in the examples, the grain size is practically 4 to 6, and such a grain size cannot be said to be perfect for deep drawing. Further, when the carbon content of the base metal is relatively large (in the examples the minimum value is 0.04%), the sum of the C-content and the carbon fixing elements make deep drawing impossible. In order to remedy this, strict caution must be exercised in the heat treatment after rolling. That is, since the sum of the C-content and the carbon fixing elements in the base metal is large, rapid cooling such as water cooling after the heating is not good for obtaining deep drawing characteristics. Mild cooling such as cooling in air or a furnace is required. However, for stainless clad steel, unless it is cooled as quickly as possible its corrosion resistivity and workability deteriorate, and since the carbon in the mild steel side has a tendency to carburize more into the stainless steel side during cooling after the heat treatment (mainly within the range of 600° to 900° C.), the method of U.S. Pat. No. 3,956,809 causes a problem in practice since it allows only mild cooling.

Although it is not so in the case of clad steels, the stabilization of carbon in stainless steels has been practiced already. For example, in the case of AISI 321, AISI 347 and SUS 430F, in order to stabilize the amount of carbon contained in them, Ti, Nb, Ta, and Zr are added to them, respectively.

Additionally, Japan Patent Publication No. 15004/1971 discloses a process for a melt-welding of steels of different kinds in which, in the case of welding the steels each containing a different amount of Cr, a welding portion which has a composition similar to that of the steel containing a smaller amount of Cr and which further contains Ti or Ti plus Nb in an amount up to 3 to 4 times the amount of carbon contained in the composite welding portion is formed between both steels, thereby the transfer of carbon due to diffusion in the boundary portion is prevented.

SUMMARY OF THE INVENTION

It is an object of the present invention to provide a clad steel or a multi-layer clad steel which can discard all defects inherent to conventional clad steels as previously explained.

It is another object of the present invention to provide a clad steel or a multi-layer clad steel which is developed taking into consideration the techniques disclosed in Japan Patent Publication No. 15004/1971, U.S. Pat. No. 3,121,949, and U.S. Patent 3,956,809 referred to above, as well as known carbon fixing techniques also discussed above. According to the present invention, as a result of studying the above publicly known techniques, a cladding steel is provided in which the carbon content in the base metal, an extremely low carbon steel, is limited to 0.010 to 0.030% and is added with carbon fixing elements in the range of 0.15 to 0.55% as a Ti-equivalent, which will to be fully explained later, so that the carburization into the cladding metal of carbon contained in the base metal is prevented.

Further, in hot rolling the clad steel according to the present invention the reduction ratio is selected to be as large as possible, and directly after completion of the hot rolling the steel is water cooled, so that growth of the grain size in the base metal which has been fined by the hot rolling is prevented. In the case of further cold rolling of the hot rolled steel, the scale on the surface is stripped to be subsequently either cold rolled or cold rolled after subjection to an intermediate heat treatment at a temperature of 900° to 960° C. Thereafter it is heat treated at a temperature of 900° to 960° C. to be subsequently forcibly rapidly cooled. According to this procedure, a clad steel is provided which has no carburization and has excellent corrosion resistivity, the base metal having a grain size less than 8 and the surface of the clad steel not becoming wavy or wrinkled after working and having excellent deep drawing characteristics.

BRIEF DESCRIPTION OF THE DRAWING

These and other objects of the present invention will become more readily apparent upon reading of the following specification and upon reference to the following drawings, FIGS. 1 to 6, which show the amount of carbon (wt %) in the base metal and the cladding metal in the examples versus the distance ($\mu$) from the bonding portion between both metals.

DESCRIPTION OF THE PREFERRED EMBODIMENTS

Figure 1:
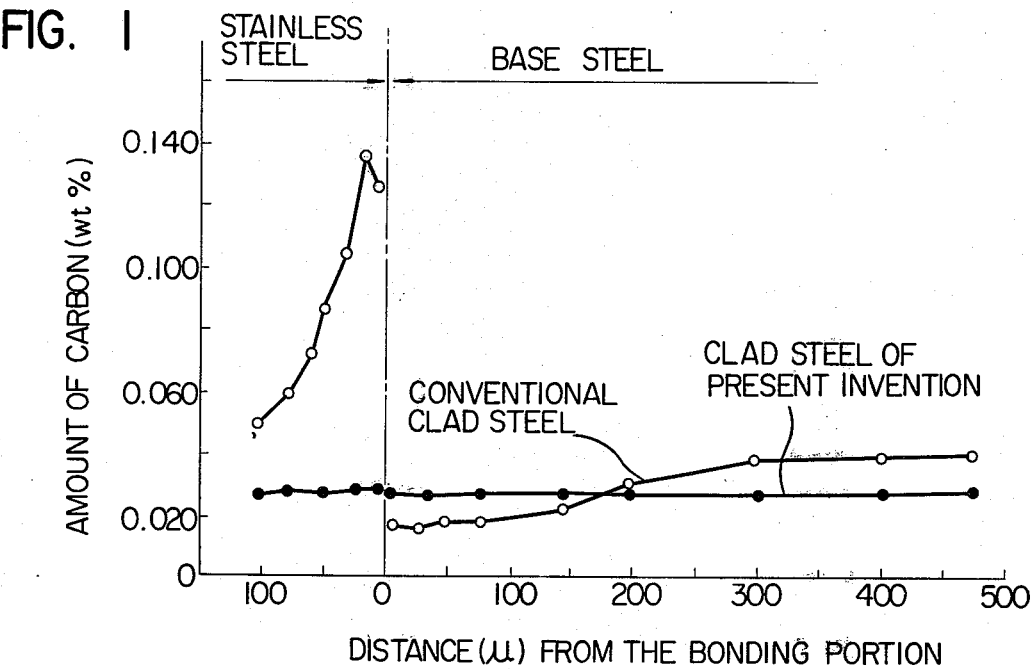

As previously explained, the inventors found that such elements as Ti, Zr, Nb, Ta and Cr are effective in suppressing the carburizing phenomena from the base metal to the cladding metal when an austenite stainless steel, nickel or a nickel alloy is treated as a cladding metal in a clad steel.

That is, precise experiments were carried out in order to determine the effect of these elements on the suppression of carburizing by adding these elements to the various base metals containing different amounts of carbon and rolling to AISI 304L. The results are as follows:

(1) In a base metal a carbon content in the range of 0.005 to 0.035 wt %, particularly 0.010 to 0.030 wt % is preferable.

(2) As the carbon stabilizing elements to be added to the base metal having the above indicated carbon range, Ti, Zr, Nb, Ta and Cr are all found effective, but particularly Ti or Zr is found to exhibit a superior effect for the addition of a relatively small amount.

Further, the amount of the carbon stabilizing elements was also extensively investigated and it was found practical to determine the amounts by introducing the idea of Ti-equivalents (wt %), as above briefly mentioned, on the basis of Ti and at the same time the range of the Ti-equivalent is to be controlled to such an extent that it does not effect the quality of the base steel in relation to its content of C.

It was found that, in order to stabilize the C in the base metal, when the contents of Ti, Zr, etc. are expressed as Ti (%), Zr (%), etc., unless Ti, Zr, etc. are added to the base metal so as to meet the following formula in relation to the amount of C in the base metal it is not possible to transform the C in the base metal to carbides to prevent the carburizing of the cladding metal:

$$\text{Ti-equivalent (wt \%)} = \text{Ti (\%)} + \frac{\text{Zr (\%)}}{1.5} + \frac{\text{Nb (\%)} + \text{Ta (\%)}}{2} + \frac{\text{Cr (\%)}}{2.5}$$

However, in practice, it is Ti and Zr that can be effectively used and do not affect the base metal, and the Ti-equivalent of Ti and Zr is preferably 10 to 45 times, or more particularly 12 to 30 times, the carbon content of the base metal. Further, the absolute value of the Ti-equivalent was found to be preferablly 0.10 to 0.8 wt %, more particularly 0.15 to 0.55 wt %. Thus, the base metal to be used in the present invention is made perfect by keeping its carbon content within the range of 0.010 to 0.030, making the ratio of Ti-equivalent to carbon content 12 to 30, and maintaining the value of Ti-equivalent of 0.15 to 0.55%.

Further, in hot rolling the clad steel according to the present invention, which comprises an extremely low carbon steel as a base metal and a cladding metal, the reduction ratio is selected to be large, and directly after the completion of the rolling the steel is water cooled so that the grain size of the base metal which has been fined by the hot rolling is prevented from growing due to the residual heat.

In the case of further cold rolling the thus hot rolled clad steel, after the scale on its surface is removed, the clad steel is either directly cold rolled or subjected to an intermediate heat treatment at a temperature of 900° to 960° C. to be subsequently cold rolled. The thus cold rolled clad steel is heat treated at a temperature of 900° to 960° C. to be forcibly rapidly cooled. Thus a clad steel is obtainable which has no carburization, has excellent corrosive resistivity, the grain size of the base metal of which is less than 8, and which does not exhibit a wavy and wrinkled surface after being subjected to working and which has excellent deep drawing characteristics. That is, the method for determining whether carburization has occurred or not such as that used for conventional clad steels whereby the existence of carburation in the bonding area of the cladding metal is judged microscopically in comparison with a clad steel in which the base metal contains no carbon fixing element is not satisfactory.

The present invention is aimed at a clad steel for which the existence of carburization is not judged microscopically, but instead is judged strictly by spectrochemical analysis, and in which carburization is only slightly detectable in the bonding area of the clad steel by the spectro-chemical analysis, the grain size of the base metal is small, and the yield strength is low to be suitable for deep drawing.

According to the present invention, even in a clad steel which has a very thin cladding metal, e.g. below 80 μ, no carburization or wavy and wrinkled surface occurs, so that an effective thickness of the cladding metal is sufficiently preserved.

Should the carbon content of the base metal exceed 0.030%, even though the carbon fixing elements are added, the carburizing has a tendency to occur. That is, although the carburization was not observed microscopically, it was confirmed by spectro-chemical analysis. If the amount of carbon exceeds 0.030%, the absolute content of the carbon fixing elements becomes large, making the clad steel inappropriate for deep drawing, i.e. when the clad steel is rapidly cooled to insure corrosion resistivity, etc., the tensile strength and yield strength are made high, making the elongation low, and the clad steel becomes unsuitable for deep drawing.

The ratio of Ti-equivalent to carbon content of the base metal is preferably 8 to 45. In particular, when the ratio is less than 8, the prevention of carburization is not complete, while on the other hand, when it exceeds 45 no change in effect on the prevention of carburization is recognized, the workability of the base metal merely deteriorating instead.

The temperature for heat treatment of the hot or cold rolled clad steel is preferably maintained at 850° to 980° C., more preferably, at 900° to 960° C. If the reheating temperature is higher than these values, e.g. above 1,000° C., the carbon diffused into the stainless steel is solid dissolved, and although no carburizing layer can be detected microscopically (of course, the carburization can be detected by chemical analysis) the grain size of the base metal is coarsened so that the deep drawing characteristics deteriorate, and after working, in the surface of the stainless steel the influence of the coarse grain of the mild steel is exhibited through a thin surface of the stainless steel, resulting in a wavy and wrinkled surface of the stainless steel, a most important defect in the clad steel of this kind, being revealed.

In manufacturing the clad steels industrially, a value of 12 to 30 for the ratio of the Ti-equivalent to the carbon content makes the manufacturing control easy and allows economical manufacturing. If the Ti-equivalent is less than 0.15 wt %, even though extremely low carbon steel as defined in the present invention is used, complete prevention of the carburization cannot be realized. On the other hand, the addition of more than 0.55 wt % does not reveal a distinctive difference in the effect on the prevention of carburization, and rather brings about the possibility of deterioration of the workability of the base metal.

The heat treatment is normally carried out within an aqueous solution of nitric acid and hydrofluoric acid, but it may be carried out in ammonium cracking gas atmosphere as well.

The heat treatment before cold rolling is not necessarily required if the hot rolled steel is already tough enough to allow the cold rolling. If it is, the hot rolled steel is preferably cold rolled without being subjected to any heat treatment.

By rapid cooling after reheating no chromium carbide is formed in the stainless steel. Since the temperature range within which carburization easily occurs is quickly passed during rapid cooling, a clad steel having no charburization, having superior corrosive resistivity and having good deep drawing characteristics can be obtained.

As to the method of cooling, simple cooling is not sufficient, instead at least fan cooling is necessary, and water cooling is prefered since it assures stable, rapid cooling.

Furthermore, the heating time must also be taken into consideration. Usually a heating time of 1 to 3 minutes per 1 mm thickness of the clad steel is desirable, but even when the thickness of the plate is small, a minimum heating time of 1 minute is required.

As to the rolling operation, there is not rolling and cold rolling, but the former is more important. Since the hot rolling is required to greatly reduce the thickness within a short time, a tandem type rolling mill is most preferable, and it is convenient for operational reasons to combine this with a reversible type rolling mill. When the clad steel to be rolled has a great length, it is advantageously wound in the form of a coil, the temperature at the time of winding being preferably below 600° C.

Although there is no relation between the reduction ratio at the time of the rolling and the carburization, the former has a close relation with the workability of the clad steel, so that the reduction should be completed within as short a time period as possible so that the grain sizes of the base metal and the cladding metal are both fixed.

In practice, it is usual that the reduction ratio is selected to be 15 to 40% per pass. If the reduction ratio is below 15% the fine grain due to the hot rolling is by no means realized. On the other hand, if the reduction ratio is above 40%, the rolling becomes so severe that the physical properties remarkably differ between the rolling direction and the direction orthogonal to the rolling direction.

In addition, it is preferable that the clad steel be water cooled directly after being hot rolled so that the fine grains obtained by the rolling do not grow owing to the residual heat.

In the case of a clad steel such as the one of the present invention in which carburization is only slightly observed, the ratio of the cladding metal to the base metal plus the cladding metal can be made small, the ratio being usually below 12%, possibly below 10%. With such a low cladding ratio, the thickness of the stainless steel, which has workability inferior to that of the extremely low carbon steel and a large strength, is made small, so that a clad steel having good deep drawing characteristics is obtainable.

Although the present invention has been explained above in connection with a clad steel comprising two layers, i.e. one base steel and one cladding metal, it will be appreciated that the present invention can be also utilized to manufacture a multi-layer clad steel by using the base steel according to the present invention as a barrier layer to be interposed between a cladding metal and a usual carbon steel.

The following exmples are illustrative, but not limitative, of the practice of the present invention.

EXAMPLE 1

In accordance with the present invention, as a base steel a plate of low carbon steel having a thickness of 50 mm, a width of 500 mm, and a length of 1,000 mm, and containing 0.025% of C as well as 0.32% of Ti-equivalent due to Ti, and as a cladding metal a plate of AISI 304L having the same dimensions as the base steel except the thickness, i.e. a thickness of 5.3 mm, and containing 0.028 wt % of C were bonded together by an explosive process. The clad steel thus bonded was heated to a temperature of 1,200° C. to be hot rolled to a whole thickness of 2.7 mm. Thereafter it was subjected to a solid solution treatment at a temperature of 940° C. After the surface was pickled, it was cold rolled to a thickness of 1.1 mm.

On the other hand, the clad steel to be compared was manufactured by bonding a base steel containing 0.035 wt % of C, but without containing carbon fixing elements with AISI 304L as a cladding metal and similarly rolling to a thickness of 1.1 mm.

The results of the investigation of the amount of carbon in the cladding metals of both clad steels carried out by spectro-chemical analysis are shown in FIG. 1, which shows that in the conventional clad steel a concentration of carbon in the cladding metal can be clearly observed, whereas in the clad steel according to the present invention the change in the amount of carbon can be scarcely observed.

Of course, no carburization was observed microscopically in the clad steel according to the present invention, whereas, in the conventional clad steel it was confirmed that the carburization had occured throughout the whole thickness of the stainless steel. Further, although in the conventional clad steel a carburizing layer of 50μ thickness was observed microscopically in the bonding boundary surface, in the clad steel according to the present invention no carburizing zone was found.

EXAMPLE 2

A clad steel was manufactured according to the present invention, in which a base metal of extremely low carbon steel having a chemical composition as shown in Table 1 and having dimensions of 50 mm thickness×300 mm width×500 mm length was bonded by an explosive process to a cladding metal of AISI 304L having a chemical composition as shown in Table 1 and having substantially similar dimensions to the base metal except for the thickness being 3 mm. As shown in Table 1, the Ti-equivalent of the base metal was 0.24% due to Ti and the ratio of the Ti-equivalent to the carbon content, 0.020%, was 12.

Similarly, a conventional clad steel was manufactured by an explosive process in which, as shown also in Table 1, a base metal of low carbon steel comprising 0.68% of Ti, 0.06% of C, the Ti/C being 11.3, and having the same size as the base metal of the present invention, and a cladding metal the same as the one of the above were used.

After the clad steels were reheated to a temperature of 1,150° C. they were rolled to a thickness of 5 mm to be cold rolled to a thickness of 1.1 mm. The cold rolled plates were heated to a temperature of 950° C. to be subsequently water cooled.

Figure 2:
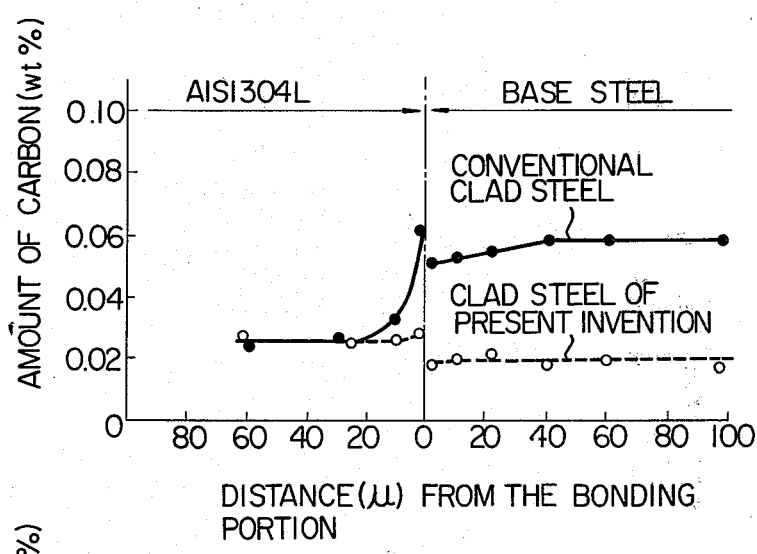

The carburization in the AISI 304L part was investigated by spectro-chemical analysis for both steels. As a result, as shown in FIG. 2, in the clad steel according to the present invention the carburization was scarcely observed, whereas in the conventional clad steel, a carburization of about 10 to 20μ was confirmed.

This difference is clearly due to the difference in carbon content in the base metals and also shows that the carbon content in a base metal to which carbon fixing elements are added must be below 0.030%.

Further, as the result of carrying our reducing working of both steels each having a thickness of 1.1 mm to check the Erichsen value, as shown in Table 2, the conventional clad steel has a lower value than the one according to the present invention. This is the effect of the surplus of the sum of the carbon content and that of the carbon fixing elements.

TABLE 1

| | CHEMICAL COMPOSITION (wt %) | | | | | | |
|---|---|---|---|---|---|---|---|
| | C | P | S | Ni | Cr | Ti | Ti/C |
| AISI 304 L | 0.026 | 0.036 | 0.006 | 10.42 | 18.30 | — | — |
| Base Metal of Present Invention | 0.020 | 0.016 | 0.009 | — | — | 0.24 | 12 |
| Conventional Base Metal | 0.060 | 0.012 | 0.010 | — | — | 0.68 | 11.3 |

TABLE 2

| | ERICHSEN VALUE | |
|---|---|---|
| | ERICHSEN VALUE (mm) | |
| Present steel | 11.2 | 11.4 |
| Conventional steel | 9.6 | 9.3 |

EXAMPLE 3

In accordance with the present invention, a base metal of extremely low carbon steel plate comprising, as shown in Table 3, 0.37% Ti-equivalent due to Ti, 0.012% C, with a Ti/C of 30.8 and having dimensions of 50 mm thickness×500 mm width×1,000 mm length was bonded on each surface to a cladding metal of AISI 304 plate comprising a chemical composition as also shown in Table 3 and having the same dimentions as the base metal except for the thickness being 4 mm. That is, a clad steel of the type—AISI 304/extremely low carbon steel/AISI 304—was manufactured.

On the other hand, a cladding metal of AISI 304 having the same dimensions as in the present invention and a base metal having a chemical composition as also shown in Table 3, i.e. 0.35% of Ti-equivalent, 0.045% of C, with a Ti/C of 7.8, were bonded together by an explosive process to produce a conventional clad steel.

After both clad steels were heated to a temperature of 1,200° C. to be hot rolled to a thickness of 3 mm in one pass, their surfaces were pickled and they were then cold rolled to a thickness of 0.7 mm.

After they were heat treated at a temperature of 900° C., the carbon content in the AISI 304 part was checked.

Figure 3:
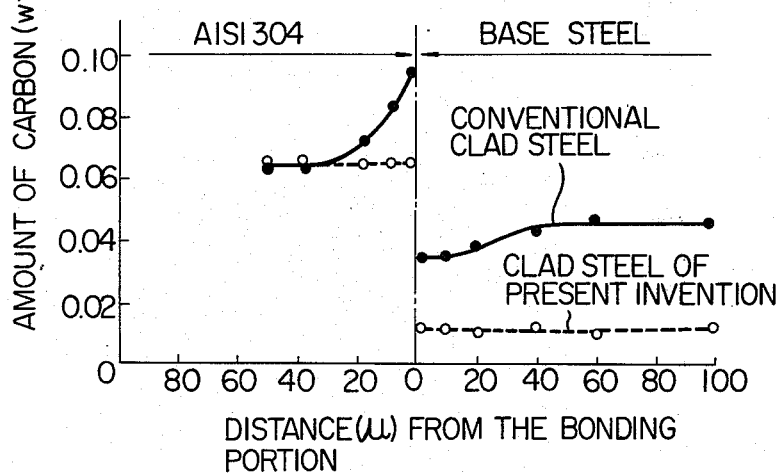

As a result, as shown in FIG. 3, no carburization was found in the clad steel of the present invention, while in the conventional clad steel having a Ti/C ratio of 7.8, although no carburization was found on the outer surface of the stainless steel, carburization was observed within the range of about 20μ from the bonding surface and also microscopic observation of the bonding surface showed slight carburization.

Further, after the conventional clad steel having a thickness of 0.7 mm was reheated at a temperature of 1,080° C. for 1 minute it was cooled in air to investigate the grain size of the base metal part, the grain size being about 5. The clad steel according to the present invention showed a grain size of the base metal of 8, and no waving and wrinkled surface was observed, also the superiority of the workability was confirmed.

From these results it is concluded that, when the carbon content of the base metal exceeds 0.04%, even though the Ti/C ratio is larger than 5, the absolute value of Ti of 0.35% seems to be too small, i.e. at least 0.4% of Ti is necessary. Further, if the heat treatment temperature exceeds 1,000° C., the grain size of the base metal which has been fined due to rolling is made large and deteriorates the workability.

TABLE 3

| | CHEMICAL COMPOSITION (wt %) | | | | | | |
|---|---|---|---|---|---|---|---|
| | C | P | S | Ni | Cr | Ti | Ti/C |
| AISI 304 | 0.065 | 0.016 | 0.010 | 8.50 | 18.20 | — | — |
| Base Metal of Present Invention | 0.012 | 0.007 | 0.014 | — | — | 0.37 | 30.8 |
| Conventional Base Metal | 0.045 | 0.012 | 0.014 | — | — | 0.35 | 7.8 |

EXAMPLE 4

According to the present invention, a base metal, an extremely low carbon steel comprising, as shown in Table 4, 0.025% C, 0.31% Ti-equivalent due to Ti, with a Ti/C ratio of 12.4, and having dimensions of 50 mm thickness×500 mm width×1,000 mm length, was bonded on both sides to a cladding metal, AISI 304, comprising the chemical composition shown in Table 4, and having the same dimensions as the base metal except for the thickness being 4 mm.

On the other hand, a base metal having the same dimensions as in the present invention and comprising, as shown also in Table 4, 0.045% C, 0.32% Ti, with a Ti/C ratio of 7.1 was bonded to AISI 304 as a cladding metal by an explosive process to produce a conventional clad steel.

The clad steel according to the present invention was reheated to a temperature of 1,150° C. to be hot rolled with six passes within about 3 minutes. Since the temperature was still 870° C., the steel was water cooled to a temperature of 550° C.

The conventional clad steel was reheated to a temperature of 1,150° C. to be hot rolled with 15 passes within about 10 minutes. Since the temperature was still 750° C., the steel was wound as a coil without being rapidly cooled.

The clad steel according to the present invention was then reheated at a temperature of 950° for 2 minutes to be subsequently rapidly water cooled.

The conventional clad steel was reheated at a temperature of 1,080° C. for 2 minutes to be similarly water cooled.

The carburization state was investigated together with the grain size and tensile properties for both clad steels.

Figure 4:
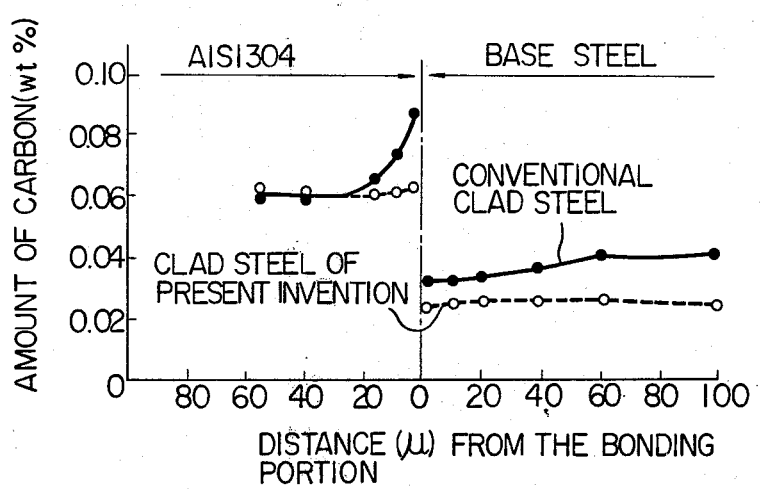
Figure 5:
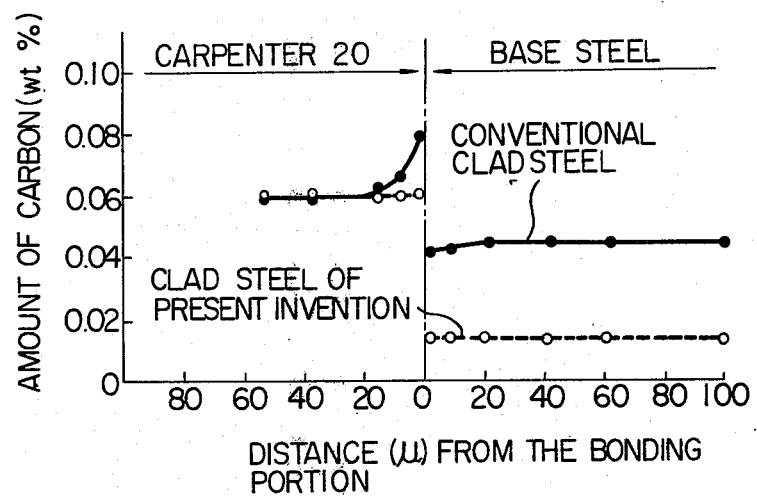

As a result, as shown in FIG. 4 and Table 5, the clad steel according to the present invention revealed no carburization and the tensile strength as well as the yield strength were low, the elongation being remarkably increased, the grain size was small, and no wavy or wrinkled surface was shown. Also the deep drawing characteristics were confirmed to be excellent.

In contrast, in the conventional clad steel, since it was heat treated at an elevated temperature carbon was solid dissolved into the cladding metal, and although the carburization was not observable with the naked eye, carburization in the degree of about 15μ was confirmed by spectrochemical analysis.

The results of the tensile test showed that for the clad steel of this invention the tensile strength and the yield strength were both high, the elongation small, and the grain size large. It was also confirmed that the conventional clad steel was not suitable for deep drawing use.

From the foregoing, it will become apparent that when the carbon content in the base metal is below 0.030% carburization is hardly detectable, and on rolling, when a large reduction ratio is adopted and the clad steel is reheated to a temperature of 900° to 960° C. to be subsequently water cooled, a clad steel sheet having excellent deep drawing characteristics is obtainable. Contrarily, when the carbon content of the base metal is above 0.04%, even when the clad steel is reheated to a temperature above 980° C. to be water cooled, the prevention of carburization is not complete, and also the deep drawing characteristics deteriorate, so that no practical use is allowed.

TABLE 4

| | CHEMICAL COMPOSITIONS (wt %) | | | | | |
|---|---|---|---|---|---|---|
| | C | P | S | Ni | Cr | Ti |
| AISI 304 | 0.060 | 0.020 | 0.010 | 8.6 | 18.35 | — |
| Base Metal of Present Invention | 0.025 | 0.011 | 0.009 | — | — | 0.31 |
| Conventional Base Metal | 0.045 | 0.014 | 0.012 | — | — | 0.32 |

TABLE 5

| TENSILE PROPERTIES AND GRAIN SIZE | | | | |
|---|---|---|---|---|
| Heating Temperature (°C.) | Tensile Strength (PSI) | Yield Strength (PSI) | Elongation (%) | Grain Size |
| Present Steel 950 | 49000 | 27000 | 48 | 8–9 |
| Conventional Steel 1080 | 76000 | 55000 | 38 | 4–5 |

EXAMPLE 5

In accordance with the present invention, a base plate, an extremely low carbon steel comprising, as shown in Table 6, 0.015% C, 0.306% Ti-equivalent due to Ti and Zr, with a Ti-equivalent/C ratio of 20.4, and having dimensions of 50 mm thickness×300 mm width×500 mm length, and cladding metal, Carpenter 20, having dimensions of 30 mm thickness×300 mm width×500 mm length, were prepared.

As a conventional clad steel, a base metal, a low carbon steel comprising, as shown in Table 6, 0.041% C, 0.22% Ti, 0.24% Nb, with a Ti+Nb/C ratio of 11.2 (Ti-equivalent/C=8.3), and having the same dimensions as the present invention, was bonded to a cladding metal, Carpenter 20.

The clad steels, i.e. the one according to the present invention and the conventional one, were heated to a temperature of 1,150° C. to be hot rolled, and clad steels each having a thickness of 5 mm were obtained.

The clad steel according to the present invention was reheated at a temperature of 920° C. for 1 minute, whereas the conventional one was reheated at a temperature of 1,050° C. for 1 minute, both being subsequently water cooled.

TABLE 6

| | CHEMICAL OMPOSITION (wt %) | | | | | | | |
|---|---|---|---|---|---|---|---|---|
| | C | P | S | Ni | Cr | Ti | Zr | Nb |
| Carpenter 20 | 0.060 | 0.020 | 0.010 | 30.1 | 21.6 | — | — | — |
| Base Metal of Present Invention | 0.015 | 0.011 | 0.009 | — | — | 0.20 | 0.16 | — |
| Conventional Base Metal | 0.041 | 0.014 | 0.012 | — | — | 0.22 | — | 0.24 |

EXAMPLE 6

According to the present invention, a base metal, an extremely low carbon steel comprising, as shown in Table 7, 0.018% C, 0.406% Ti-equivalent due to Zr, with a Ti-equivalent/C ratio of 22.6, and having dimensions of 10 mm thickness×200 mm width×300 mm length was bonded by an explosive process to a Ni-plate having a thickness of 1.5 mm.

A conventional clad steel was also prepared in which a base metal, a low carbon steel comprising, as shown in Table 7, 0.045% C, 0.35% Nb, with a Nb/C ratio of 7.8, and having the same size as the above, was bonded to a Ni-plete having a thickness of 1.5 mm by an explosive process.

The clad metals were heated to a temperature of 900° C. for 2 hours to be subsequently fan cooled.

Figure 6:
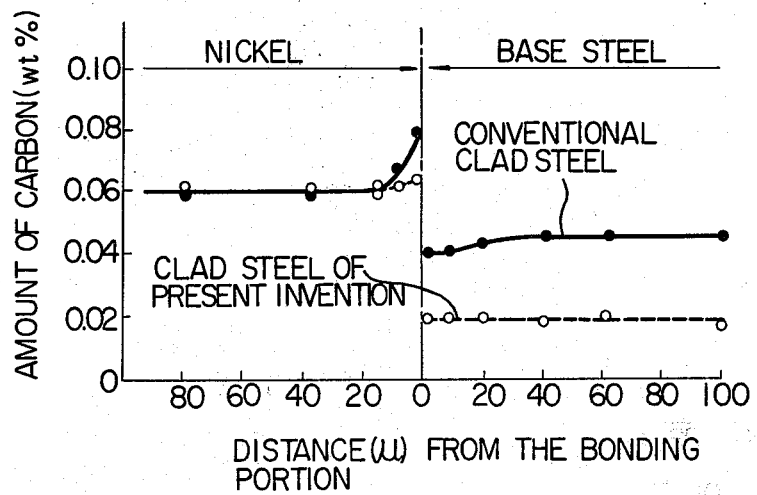

The carburization state was checked by spectrochemical analysis for both steels. As a result, as shown in FIG. 6, although in the clad steel according to the present invention carburization was scarcely detected, the conventional clad steel showed carburization in the order of about 15μ with spectrochemical analysis. However, in both steels no carburization was observed microscopically.

Although the former clad steel did not show carburization, the latter showed carburization to a depth of 20μ from the bonding boundary surface with spectrochemical analysis and microscopically a carburizing layer of 2 to 4μ was observed.

Also the tensile properties were tested, as shown in Table 8, and it is apparent that there are also clear differences in the tensile properties between both clad steels.

TABLE 7

| | CHEMICAL COMPOSITION (wt %) | | | | | | |
|---|---|---|---|---|---|---|---|
| | C | P | S | Ni | Cr | Zr | Nb |
| Nickel | 0.06 | — | 0.004 | 99.20 | — | — | — |
| Base Metal of Present Invention | 0.018 | 0.010 | 0.013 | — | — | 0.61 | — |
| Conventional Base Metal | 0.045 | 0.014 | 0.012 | — | — | — | 0.35 |

TABLE 8

| | TENSILE PROPERTIES | | | |
|---|---|---|---|---|
| | Heating Temperature (°C.) | Tensile Strength (PSI) | Yield Strength (PSI) | Elongation (%) |
| Present Steel | 920 | 46000 | 25000 | 45 |
| Conventional Steel | 1050 | 72000 | 52000 | 30 |

What is claimed is:

1. A clad steel in which a base metal of extremely low carbon steel is bonded together with an austenite stainless steel, nickel or nickel alloy as a cladding metal by hot rolling, wherein in order to prevent diffusion of carbon contained in the base metal into the cladding metal due to a heat cycle subjected to during or after the manufacturing of the clad steel, the base metal contains 0.010 to 0.030 wt. % of carbon with Ti and/or Zr added as carbon fixing elements in such an amount that a Ti-equivalent is given by the following formula:

$$\text{Ti-equivalent (wt \%)} = Ti\ (\text{wt \%}) + [Zr\ (\text{wt \%})/1.5]$$

wherein, Ti (wt %) and Zr (wt %) representing the amounts of Ti and Zr, respectively in wt %; is 0.15 to 0.55 wt % and yet the ratio of the Ti-equivalent to the carbon content is 12:1 to 30:1, and during said hot rolling of the clad steel a 15 to 40% reduction ratio is adopted per pass, and directly after the hot rolling the clad steel is water cooled, said base metal thereby having a grain size number larger than No. 8.

2. A clad steel as claimed in claim 1 wherein after being hot rolled the clad steel is cold rolled and reheated to a temperature of 900° to 960° C. to be subsequently rapidly cooled, thereby regulating the structures of both the base metal and the cladding metal.

3. A clad steel as claimed in claim 2 in which a multilayer clad steel is provided by said base metal being bonded with cladding metals on both its surfaces and wherein the thickness ratio of the cladding metal to the base metal at one surface is made less than 12% so as to be suitable for deep drawing use.

4. A multi-layer clad steel in which an extremely low carbon steel is interposed on an interlayer metal between an austenite stainless steel, nickel or nickel alloy as a cladding metal and a carbon steel or a low-alloy steel as a base metal by a hot rolling, wherein in order to prevent diffusion of carbon contained in the base metal into the cladding metal due to subjection to a heat cycle, the extremely low carbon steel interlayer metal contains 0.01 to 0.030 wt % of carbon with Ti and/or Zr added as carbon fixing elements in such an amount that a Ti-equivalent is given by the following formula:

$$\text{Ti-equivalent (wt \%)} = Ti\ (\text{wt \%}) + [Zr\ (\text{wt \%})/1.5]$$

wherein, Ti (wt %) and Zr (wt %) representing the amounts of Ti and Zr, respectively in wt %; is 0.15 to 0.55 wt % and yet the ratio of the Ti-equivalent to the carbon content is 12:1 to 30:1, and during said hot rolling of the clad steel a 15% to 40% reduction ratio is adopted per pass, and directly after the hot rolling the clad steel is water cooled, said base metal thereby having a grain size number larger than No. 8.

* * * * *